United States Patent [19]

Ikeda et al.

[11] Patent Number: 4,617,755
[45] Date of Patent: Oct. 21, 1986

[54] APPARATUS FOR PLANT CULTIVATION

[75] Inventors: Akira Ikeda; Shigeki Nakayama; Toshitsugu Ishii; Isao Itakura, all of Hyogo, Japan

[73] Assignee: Mitsubishi Denki Kabushiki Kaisha, Tokyo, Japan

[21] Appl. No.: 665,231

[22] Filed: Oct. 26, 1984

[30] Foreign Application Priority Data

Oct. 28, 1983 [JP] Japan .................................. 58-203307
Oct. 28, 1983 [JP] Japan .................................. 58-203315

[51] Int. Cl.⁴ .............................................. A01G 31/02
[52] U.S. Cl. ......................................................... 47/65
[58] Field of Search .................. 47/65, 64, 63, 59, 62; 198/728, 459

[56] References Cited

U.S. PATENT DOCUMENTS

| 3,266,614 | 8/1966 | Griner | 198/459 |
| 4,019,624 | 4/1977 | Torres | 198/728 |
| 4,028,847 | 6/1977 | Davis et al. | 47/65 |
| 4,216,618 | 8/1980 | Haub et al. | 47/65 |
| 4,226,176 | 10/1980 | Macchi | 198/728 |

Primary Examiner—Robert A. Hafer
Assistant Examiner—Bradley M. Lewis
Attorney, Agent, or Firm—Sughrue, Mion, Zinn, Macpeak and Seas

[57] ABSTRACT

A system for the automated cultivation of plants includes a plurality of guide rail pairs which support conveyor driven jigs carrying individual plants thereon. As the plants are driven by the conveyors, the driving elements or dogs on successive conveyors are increasingly spaced, so as to allow for the steady growth of the plants. The guide rails are arranged in a radial array to allow for increasing side-wise plant clearance, and are orificed as a means of providing the plants with air and nutrients.

5 Claims, 4 Drawing Figures

APPARATUS FOR PLANT CULTIVATION

BACKGROUND OF THE INVENTION

The present invention relates to an apparatus for cultivating plants under artificial conditions and, particularly, to such an apparatus capable of enhancing land productivity and lowering energy consumption.

It has been known that the growing of plants depends largely upon environmental conditions. Natural conditions vary geographically and are not always suitable for agriculture in terms of productivity. Time periods (growing seasons) in which conditions are suitable for production do not exist on some areas of the earth, or exist for only a very short time in other areas. Factory (greenhouse) cultivation is intended to artifically compensate for environmental factors which cause the lowering of agricultural productivity. However, since the factory itself is not completely isolated from the natural environment, there is a limit to the productivity improvement.

In view of the foregoing, it has been proposed to establish an artificial environment which is completely isolated from natural conditions to thereby allow the agricultural product to completely fulfill its growth potential. This so-called "plant factory" is intended to provide an environment in which plants are cultivated under conditions which can be arbitrarily controlled whereby completely controlled production is possible.

In order to establish such an artificial environment, however, the considerable energy consumption required is an economic problem. To effectively utilize the merits of the plant factory is to therefore resolve the problems of land productivity and energy consumption.

SUMMARY OF THE INVENTION

An object of the present invention is to provide a plant cultivating apparatus comprising a plurality of jigs, each for supporting a plant, a plurality of radially extending guide rails, each movably supporting a predetermined number of said jigs, and a plurality of transporting means provided for each of said guide rails, said transporting means for each said guide rail being arranged in series along said guide rail, each transporting means including a plurality of equidistantly arranged dogs for holding and transporting said jigs in one direction along said guide rail, a distance between adjacent ones of said dogs of one of said transporting means being identical to that of any other one of said transporting means arranged in a corresponding position along said guide rail, said distance being increased with the distance from a starting end of said rail, whereby plants may be cultivated in the smallest possible area and with minimized energy consumption.

DETAILED DESCRIPTION OF THE PREFERRED EMBODIMENTS

An embodiment of the present invention will now be described with reference to the accompanying drawings.

Figure 1:
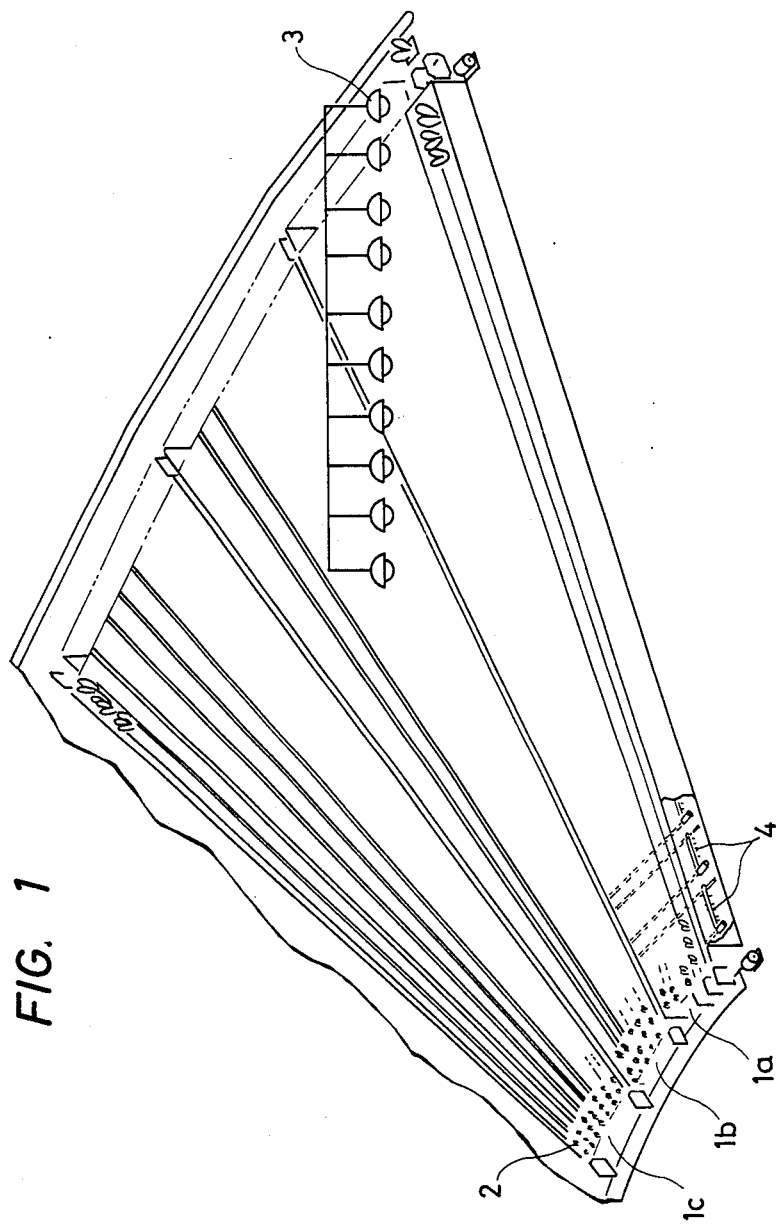
FIG. 1 is a partially removed perspective view of a plant cultivating apparatus according to one embodiment of the present invention.

FIG. 1 is a partially removed perspective view of the plant cultivating apparatus, wherein reference numerals 1a to 1c are nurseries from which young plants 2 are automatically supplied, from, for example, seeding and seedling devices (not shown). The young plants 2 are supported by jigs, respectively, which are movable along guide rails to be described later. Reference numeral 3 shows lamps suspended by, for example, ceiling of the factory for uniformly irradiating the nurseries 1a to 1c with the required light intensity. The nurseries 1a to 1c and the lamps 3 are arranged in a closed space. Reference numeral 4 shows dog members arranged at fixed intervals. The dog members 4 form transporting means for holding the jigs and for transporting them along the guide rails in one direction. In this embodiment, the transporting means is a belt conveyor having protruding nails as dogs. A plurality of such transporting means are provided for each guide rail. The distance between adjacent nails on any one belt conveyor 4 is uniform and varies between sequential belt conveyors.

Figure 2:
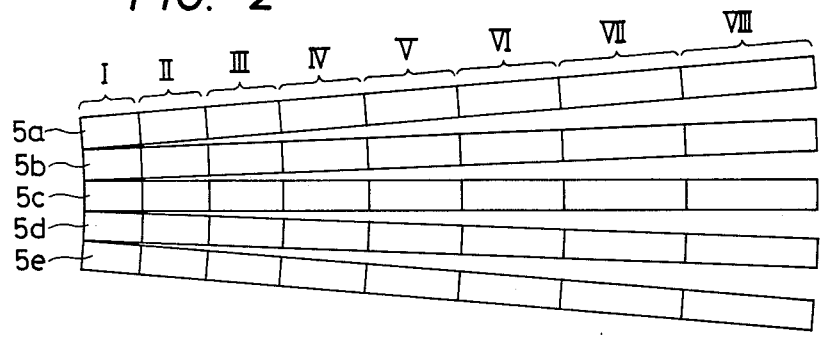
FIG. 2 is a plane view showing the arrangement of guide rails in one cultivating nursery.

FIG. 2 shows the arrangement of the guide rails in the nurseries. In FIG. 2, the guide rails 5a to 5e extend radially, so that the growing plants being transported radially outwardly along the rails do not overlap one another. Each nursery is divided along the transport direction into blocks corresponding in number to the number of days of growth. In this case, 8 blocks labeled I to VIII are provided, which may be sufficient for green vegetables such as salad greens. In each block, the same number of plants in the same growing stage are arranged, and a nail-belt conveyor 4 shown in FIG. 1 is separately provided.

Figure 3:
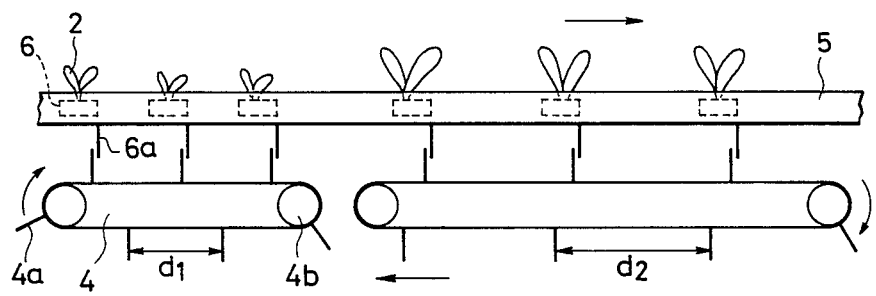
FIG. 3 is a side view showing the movement of plants along the guide rails.

FIG. 3 shows the relation between the rail 5 and the transporting means 4 in the form of the belt conveyor, and the transporting means 4 in the form of the belt conveyor. In FIG. 3, is driven by a driving motor 4b. On the guide rail 5, a plurality of the jigs 6 are movably supported. Each jig 6 is formed with a guide pin 6a implanted therein.

The distance $d_1$ between adjacent ones of the nails 4a of any one of the belt conveyors 4 is uniform, and the distance $d_2$ between adjacent nails of an adjacent belt conveyor disposed downstream of the one belt conveyor 4 is larger than $d_1$. The nails 4a contact the guide pins 6a of the jigs 6, respectively, to thus transport the plants 2 in the direction shown by the arrow, with a fixed (but stepwisely increasing) space between the plants 2.

Figure 4:
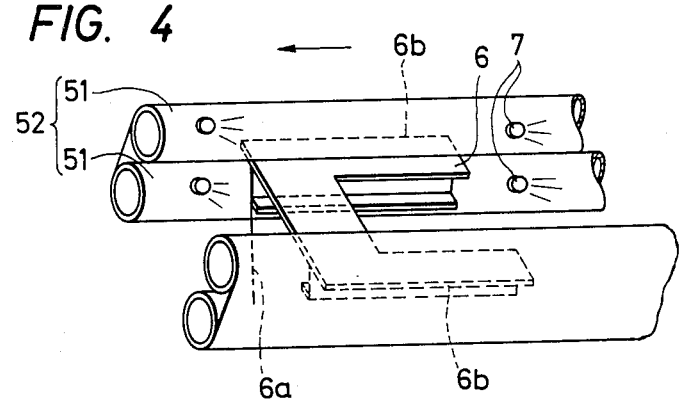
FIG. 4 is a perspective view of the guide rail and jigs used in one embodiment of the present invention.

FIG. 4 is a perspective view showing more detailed examples of the guide rail and the jig. In FIG. 4, reference numeral 51 indicates a pair of pipes, each having orifices 7 formed at a fixed interval. The two pipes 51 arranged in over and under fashion constitute a pipe body 52. A pair of pipe bodies 52 are arranged in parallel horizontally to constitute one guide rail. Opposite ends 6b of the jig 6 are slidably supported between the pipes 51 of the pipe bodies 52, respectively. Upper ones of the pipes 51 of the pipe bodies 52 are supplied with pressure regulated air in such a way that air is blown through the orifices 7 onto the plants. On the other hand, lower ones of the pipes 51 of the pipe bodies 52 are continuously or intermittently supplied with a liquid nutrient-salt solution, to supply the nutrient-salt solution through orifices 7 to the root portions of the plants. A portion of the nutrient solution is absorbed by the root portions and the remaining portion is recovered in a pan (not shown) and recirculated until it becomes ineffective. In FIG. 4, the arrow shows the moving direction of the jig 6. In this embodiment, the jig 6 takes the form of a U-shaped plate, the leg portions of which are slidably supported between the pipes 51 of the pipe bodies 52. A member for holding a plant supporting material, such as a urethane foam member, is formed on a lower surface of the plate 6.

In operation, in FIGS. 1 to 4, the young plants 2 supplied sequentially from the seedling device (not shown), to the first block I of the nurseries 1a to 1c, each having one or a plurality of the guide rails 5a to 5e, are held by the jigs 6 in the first block I by driving the belt conveyor 4 disposed in the same block.

If the belt conveyor 4 is designed such that it can move between the first blocks I of the respective guide rails 5a to 5e or between the respective nurseries 1a to 1c, it may be possible to stock the young plants in all of the nurseries 1a to 1c using a single conveyor 4.

When one day elapses after the completion of the stocking of the young plants, the belt conveyors 4 in the first blocks I and the second blocks II are actuated to move the plants 2 from the first blocks I to the second blocks II. At the same time, the next set of seedlings are stocked in the first blocks I in the described manner. Since the distance between the nails of the belt conveyor in the second block is larger than that in the first block, a sufficient space is provided between the growing plants.

The plants are moved stepwise toward the blocks VIII and are allowed to grow therein for one day, after which they are harvested.

With the above process, it is possible to yield a constant amount of vegetable greens each day using a very simple construction. Further, since the guide rails 5 extend radially and the distance between the nails 4a of the belt conveyors 4 in one block is made larger than that in preceding blocks, it is possible to expand the space between adjacent plants with the growth thereof. Therefore, it is possible to cultivate as many plants as possible in a minimized area and to thus minimize the space necessary for cultivation. As a result, it is possible to reduce energy (light and heat) requirements. Furthermore, it is possible to perform all of the processes from the stocking of the young plants in the nurseries 1a to 1c to the yield automatically, resulting in reduced labor costs.

Although in the illustrated embodiment, the guide rail 5 is constituted of pipes 51 having orifices 7 so that air and a nutrient-salt solution may be supplied through these pipes to the plants, it is of course possible to provide an air supply mechanism and a nutrient-salt solution supply mechanism separately from the guide rail.

It should be noted that the structures of the guide rail 5 and the jig 6 are not limited to those shown. Also, the transporting means 4 may be constituted of devices than belt conveyors having nails or dogs.

Although each of the nurseries 1a to 1c is divided into 8 blocks I to VIIII each having a plurality (in FIG. 3, three) of plants 2, the number of blocks and the number of plants included in each block can be arbitrarily selected according to the kind of plant to be cultivated, etc. Further, the time period during which the plant stays in one block may be varied accordingly. Further, although the shift of the plant from one block to a subsequent block is performed stepwise, it may be continuously performed.

The stocking of young plants may be performed automatically or by hand.

As described hereinbefore, according to the present invention, the cultivating apparatus comprises a plurality of jigs, each supporting a plant; a plurality of radially extending guide rails, each movably supporting a predetermined number of jigs; and a plurality of transporting means provided for each of the guide rails. The transporting means for each guide rail has a plurality of equidistantly arranged dogs for holding and transporting the jigs in one direction along the guide rail. The distance between the dogs of a given transporting means is larger than that of a preceding transporting means. Therefore, the plants can be cultivated in the smallest area possible with commensurate energy savings.

We claim:

1. A plant cultivating apparatus, comprising; a plurality of jigs, each for supporting a plant; a plurality of radially extending guide rails, each for movably supporting a predetermined number of said jigs; and a plurality of transporting means provided for each of said guide rails, said transporting means for each said guide rail being arranged in series along said guide rail, said transporting means moving relative to said guide rails, each said transporting means including a plurality of equidistantly arranged dogs said dogs engaging with and moving said jigs in a first direction along said guide rail, with a distance between adjacent ones of said dogs on one of said transporting means being identical to that of any other one of said transporting means arranged at a corresponding position along said guide rails, said distance being stepwise increased with the distance from a starting end of said rail, with successive serial transporting means.

2. A plant cultivating apparatus as claimed in claim 1, wherein each plant is stepwise transported from one of said transporting means to a serially subsequent transporting means.

3. A plant cultivating apparatus as claimed in claim 1, wherein said guide rail comprises a pair of horizontally arranged parallel pipe bodies, each being composed of a pair of vertically arranged parallel pipes with a gap therebetween, said jig being slidably supported at opposite ends thereof within said gaps.

4. A plant cultivating apparatus as claimed in claim 3, wherein each of said pipes is formed with orifices, upper pipes of said pipe bodies and lower pipes of said pipe bodies being respectively supplied with one of an air and a nutrient-salt solution, to thereby supply air and said nutrient-salt solution through said orifices to said plants.

5. A plant cultivating apparatus as claimed in claim 1, wherein at least one of said transporting means is movable in a second direction transverse to said first direction, whereby said transporting means may be moved from a position along one of said guide rails to a corresponding position along another of said guide rails.

* * * * *